United States Patent [19]

Baldry

[11] 4,357,975
[45] Nov. 9, 1982

[54] ANTI-SKID CHAIN

[75] Inventor: John F. Baldry, Shakespeare, Canada

[73] Assignee: Dominion Chain Inc., Stratford, Canada

[21] Appl. No.: 193,157

[22] Filed: Oct. 2, 1980

[51] Int. Cl.³ .......................................... B60C 27/00
[52] U.S. Cl. ................................ 152/223; 24/116 R; 59/93; 152/179; 152/228; 152/242; 152/244; 403/64; 403/157
[58] Field of Search ................... 152/223, 216, 225 R, 152/226, 225 C, 227, 228, 230, 239, 241–245, 170, 172, 189, 179; 59/78, 86, 93; 24/69 T, 69 TT, 70 TT, 102 P, 316, 317, 326, 102 R, 116 R, 129 R; 305/19, 53; 301/42, 44 T; 294/78 R, 78 A; 278/52, 65, 96; 403/157, 64

[56] References Cited

U.S. PATENT DOCUMENTS

| | | | |
|---|---|---|---|
| 2,664,608 | 1/1954 | Beck | 24/373 |
| 2,834,391 | 5/1958 | Hellman | 152/213 R |
| 3,603,371 | 9/1971 | Müller | 152/239 |
| 3,802,477 | 4/1974 | Sobota | 152/231 |
| 3,835,908 | 9/1974 | Rieger et al. | 152/243 |
| 3,895,419 | 7/1975 | Roberts | 24/230.5 R |
| 3,999,584 | 12/1976 | Lossev | 152/213 R |
| 4,020,885 | 5/1977 | Sato | 152/239 |
| 4,042,001 | 8/1977 | Müller | 152/243 |
| 4,161,976 | 7/1979 | Schmitt et al. | 152/239 |
| 4,243,088 | 1/1981 | Labonville | 152/223 |

Primary Examiner—Edward C. Kimlin
Assistant Examiner—Thomas Bokan
Attorney, Agent, or Firm—Ridout & Maybee

[57] ABSTRACT

An anti-skid tire chain comprising a pair of parallel side chains, a series of traction rings extending medially between the side chains, and a network of connector chains interconnecting the traction rings with the side chains and with one another is characterized in that the connector chains are interconnected in threes by triradial connector plates. Each triradial connector plate consists of three plate elements welded together, each plate element providing a pair of opposite end portions, subtending an angle of 120° to one another and an arcuate mid-portion defining a convex cylindrical surface, the plate elements being mutually welded together at the convex surfaces thereby defining a symmetrical triradial configuration providing three radially extending pairs of parallel arms, each pair of arms defining a clevis for receiving an end link of a respective connector chain, and including a removable clevis pin for retaining the end link.

9 Claims, 6 Drawing Figures

ANTI-SKID CHAIN

FIELD OF THE INVENTION

This invention relates to an anti-skid tire chain of the type primarily intended for heavy duty vehicles such as skidders, loaders, graders, loggers and trucks to increase the traction and side stability of such vehicles when operating on soft ground.

BACKGROUND OF THE INVENTION

An anti-skid tire chain of this type normally comprises a pair of parallel side chains which extend circumferentially around the tire, a series of traction rings extending medially between the side chains, and a network of connector chains interconnecting the traction rings with the side chains and with one another. Such chains are well known in the art, and are exemplified by the "Norse Chain" supplied by Anchor Industries Ltd. of Prince George, British Columbia, the "Ring-Chain-SR" supplied by Canadian Chains Inc. of Skowhegan, Maine, and the "Trygg" chain supplied by Wesco Industries Ltd., of Vancouver, British Columbia. In these constructions the connector chains are interconnected in threes by auxiliary connector rings, the connector rings being arranged in two rows extending parallel to the side chains on either side of the series of traction rings.

The medially extending traction rings constitute the main traction elements of the chain, but other parts of the chain in the region of the traction rings are positioned to engage the ground and are subjected to wear which necessitates frequent replacement of the connector chains. Furthermore, such elements of the chain, being disposed to one side of the median, are subjected to uneven wear.

SUMMARY OF THE INVENTION

It is an object of the present invention to provide an improved anti-skid tire chain of the type referred to wherein the means interconnecting the connector chains are constructed to serve as auxiliary traction elements, and are connected in such a way as to facilitate their being reoriented periodically to compensate for uneven wear. In this way the useful life of a chain can be greatly extended.

An anti-skid tire chain in accordance with the present invention, comprising a pair of parallel side chains, a series of traction rings extending medially between the side chains, and a network of connector chains interconnecting the traction rings with the side chains and with one another, is characterized in that the connector chains are interconnected in threes by triradial connector elements each having a symmetrical triradial configuration. This configuration provides three radially extending pairs of parallel arms or lugs, each pair of arms or lugs defining a clevis for receiving an end link of a respective connector chain, and including a removable clevis pin for retaining the end link. The clevis pins may be threaded bolts or spiral steel pins.

In one preferred embodiment of the invention each of the connector elements consists of three plate elements welded together, each plate element providing a pair of opposite end portions subtending an angle of 120° to one another and an arcuate mid-portion defining a convex cylindrical surface, the plate elements being mutually welded together at said convex surfaces thereby defining said symmetrical triradial configuration. However, it is to be understood that the triradial connector elements, instead of being of a welded construction, may alternatively be castings or forgings.

By reason of the construction of the triradial connector elements, the radial arms or lugs provide respective ground-engaging edges and so serve as auxiliary traction elements alongside the main traction rings. They are subjected to uneven wear during use, of course, but since they are readily disconnectable from the connector chains they can be rotated periodically by 120° so as to compensate for uneven wear over a long period of use. The life of a connector element is greatly extended, since even after it has been used in three orientations it can be reversed so as to turn the worn edges in towards the tire.

BRIEF DESCRIPTION OF THE DRAWINGS

In order that the invention may be readily understood, one preferred embodiment thereof will now be described, by way of example, with reference to the accompanying drawings in which.

DESCRIPTION OF THE PREFERRED EMBODIMENT

Figure 1:
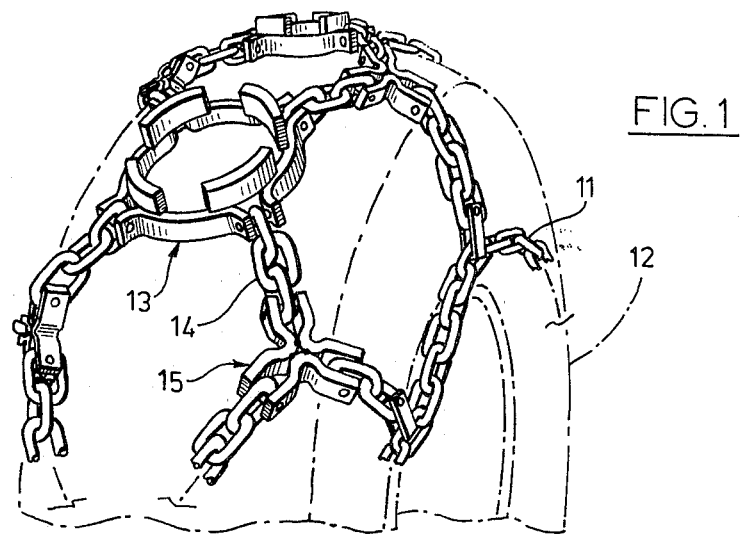
FIG. 1 shows part of an anti-skid tire chain mounted on a tire, the outline of the tire being shown in chain dotted lines.

Referring to the drawings, the tire chain comprises a pair of parallel side chains 10, 11 or tension chains, which extend circumferentially round the tire 12. These chains are not in engagement with the ground. The main traction elements are a series of traction rings 13 which extend round the tire medially between the side chains 10, 11. The traction rings are interconnected with one another and with the side chains 10, 11 by means of a network of connector chains 14, which are interconnected in threes by two series of triradial connector elements 15. As will be appreciated from the view shown in FIG. 1, the triradial connector elements 15 are positioned to serve as auxiliary traction elements and will be subjected to uneven wear during use.

Figure 2:
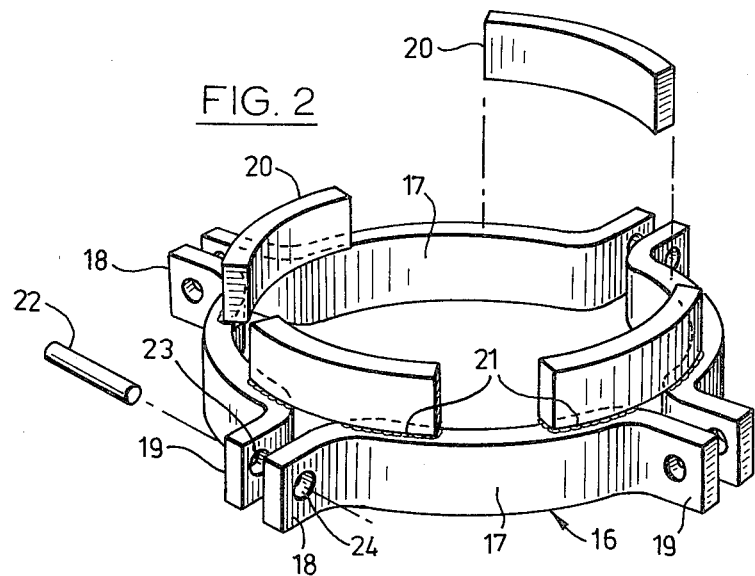
FIG. 2 illustrates one of the traction rings of the tire chain.

As illustrated in FIG. 2, each of the main traction rings 13 is formed by a plurality of, in this example four, arcuate plate elements 16, each of which provides an arcuate intermediate portion 17 and a pair of outwardly turned end flanges 18, 19. The four plate elements are interconnected to form a closed ring by means of four arcuate lugs 20 which are welded to the plate elements 16 as indicated at 21. Each of these lugs bridges the gap between the spaced ends of two adjacent plate elements 16. As will be readily apparent from FIG. 1, these lugs project outwardly from the tire for engagement with the ground to provide traction. An important feature of this construction is that the outwardly turned end flanges 18, 19 cooperate in pairs to define four clevises. Each of the clevises is wide enough to receive an end link of a respective connector chain 14, which connector chain is retained by means of a threaded bolt or spiral steel pin 22 which extends through the end link and is retained by a pair of opposed holes 23, 24 in the end flanges. The clevis pin 22 is readily removable and readily replaceable in order to facilitate replacement of the associated connector chain in the field when required.

Figure 3:
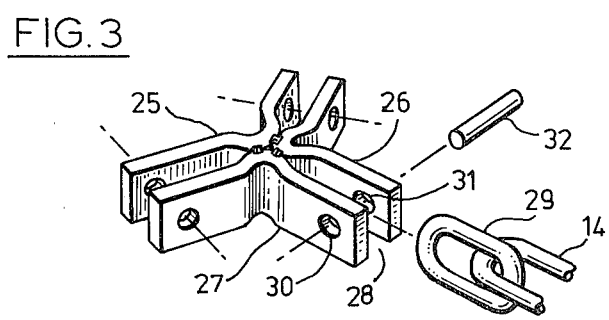
FIG. 3 illustrates one of the connector plates of the tire chain.
Figure 4:
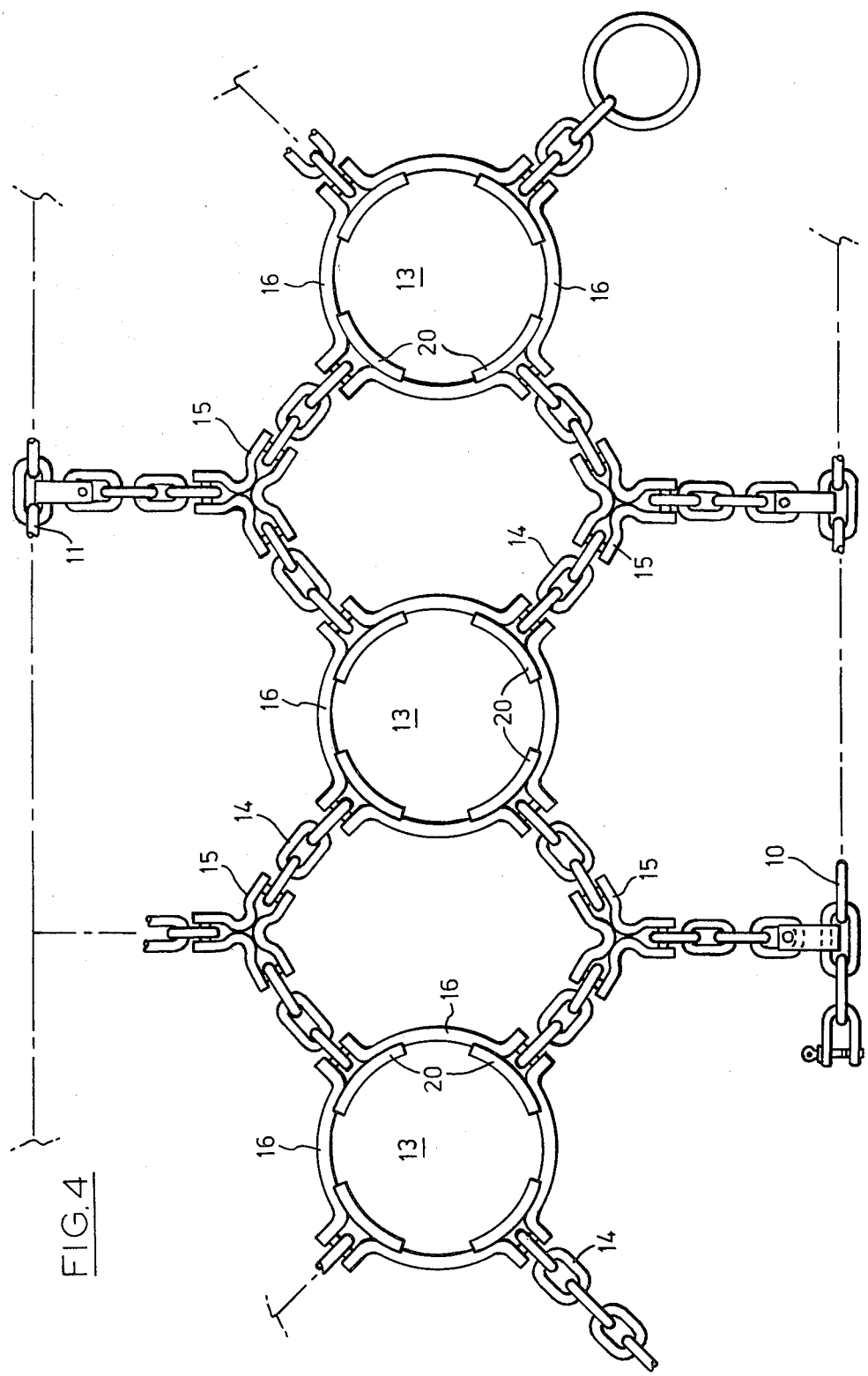
FIG. 4 is a developed view showing part of the tire chain.

Referring now to FIG. 3, each of the triradial connector elements 15 consists of three plate elements 25, 26 and 27. Each of the plate elements includes a pair of opposite end portions which subtend an angle of 120° to one another and an arcuate mid-portion which defines a convex cylindrical surface. The three plate elements are mutually welded together at the convex surfaces so as to define a symmetrical triradial configuration as shown in FIG. 3. The connector thus provides three radially extending pairs of parallel arms formed by the end portions of the plate elements 25, 26 and 27, each pair of arms defining a clevis 28 for receiving an end link 29 of a respective connector chain 14. The arms are formed with a pair of opposed holes 30, 31 to receive a removable clevis pin 32, which may be a threaded bolt or a spiral steel pin, for retaining the end link 29 in the clevis.

Figure 5:
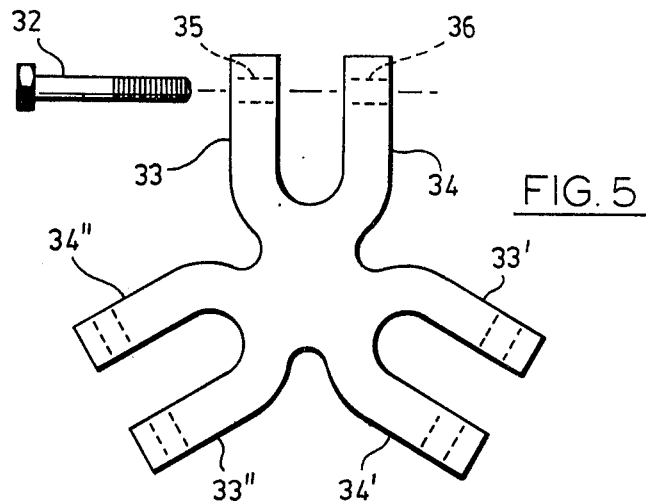
FIG. 5 shows in plan view an alternative form of triradial connector element.
Figure 6:
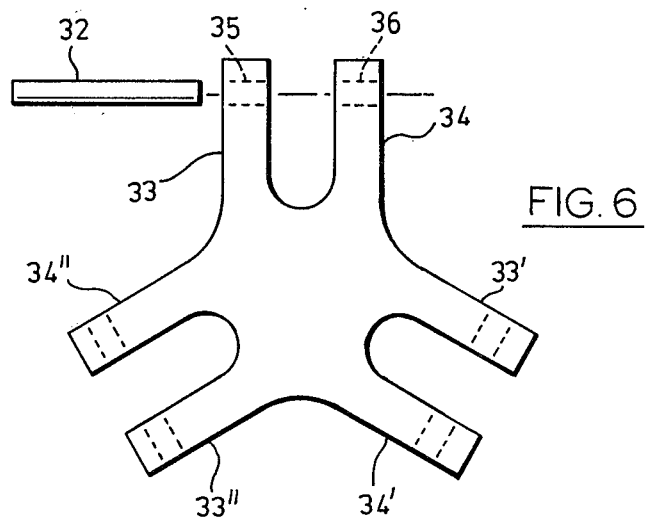
FIG. 6 shows in plan view a second alternative form of triradial connector element.

The triradial connector elements, instead of having the welded plate construction illustrated in FIG. 3, may alternatively be cast or forged as unitary structures as illustrated in FIGS. 5 and 6. As in the embodiment previously described, each of these connector elements, cast or forged in one piece, has a symmetrical triradial configuration providing three radially extending pairs of parallel arms 33 and 34, 33' and 34', 33" and 34". Each pair of arms defines a clevis for receiving the end link of a respective connector chain, as previously described, and a pair of opposed holes 35, 36 to receive a removable clevis pin 32, which may be a threaded bolt or a spiral steel pin, for retaining the end link in the clevis.

It will be readily appreciated that the construction described above and illustrated in the drawings has the special advantage that elements of the chain can be readily replaced in the field by reason of the fact that it is not an all welded construction. Another important advantage is that the triradial connectors 15, in contrast to the conventional connector rings, are formed as plate structures which serve as auxiliary traction elements. These auxiliary traction elements are subjected to uneven wear in use, but by reason of their triradial configuration. and the manner in which they can be readily disconnected from and reconnected to the associated connector chains, they can be rotated periodically, and reversed, for the purpose of prolonging their useful life.

What I claim is:

1. An anti-skid tire chain comprising a pair of parallel side chains, a series of traction rings extending medially between the side chains, and a network of connector chains interconnecting the traction rings with the side chains and with one another, characterized in that the connector chains are interconnected in threes by triradial connector elements constituting auxiliary traction elements arranged in two rows extending parallel to the side chains on either side of the series of traction rings, each having a symmetrical triradial configuration providing three radially extending pairs of parallel lugs, the lugs of each pair providing respective ground-engaging edges and defining a clevis for receiving an end link of a respective connector chain, and including a removable clevis for retaining said end link.

2. An anti-skid tire chain according to claim 1, wherein the clevis pins are threaded bolts.

3. An anti-skid tire chain according to claim 1, wherein each traction ring is formed by a plurality of arcuate plate elements each providing a pair of outwardly turned end flanges, the plate elements being interconnected by ground-engaging lugs welded thereto to form a closed ring, the closed ring providing a corresponding plurality of pairs of outwardly directed spaced arms constituted by said end flanges, each pair of arms defining a clevis for receiving an end link of a respective connector chain, and including a clevis pin for retaining said end link.

4. An anti-skid tire chain according to claim 1, wherein each of the connector elements is a unitary casting or forging.

5. An anti-skid tire chain comprising a pair of parallel side chains, a series of traction rings extending medially between the side chains, and a network of connector chains interconnecting the traction rings with the side chains and with one another, characterized in that the connector chains are interconnected in threes by triradial connector plates each consisting of three plate elements welded together, each plate element providing a pair of opposite end portions, subtending an angle of 120° to one another and an arcuate mid-portion defining a convex cylindrical surface, said plate elements being mutually welded together at said convex surfaces thereby defining a symmetrical triradial configuration providing three radially extending pairs of parallel arms formed by said end portions, each pair of arms defining a clevis for receiving an end link of a respective connector chain, and including a removable clevis pin for retaining said end link.

6. An anti-skid tire chain according to claim 5, wherein the clevis pins are threaded bolts.

7. An anti-skid tire chain according to claim 5, wherein each traction ring is formed by four arcuate plate elements each providing a pair of outwardly turned end flanges, the four plate elements being interconnected by ground-engaging lugs welded thereto to form a closed ring, the closed ring providing four pairs of outwardly directed spaced arms constituted by said end flanges, each pair of arms defining a clevis for receiving an end link of a respective connector chain, and including a clevis pin for retaining said end link.

8. An anti-skid tire chain according to claim 5, wherein the connector elements are arranged in two rows extending parallel to the side chains on either side of the series of traction rings.

9. An anti-skid tire chain comprising a pair of parallel side chains, a series of traction rings extending medially between the side chains, and a network of connector chains interconnecting the traction rings with the side chains and with one another, characterized in that the connector chains are interconnected in threes by triradial connector elements constituting auxiliary traction elements arranged in two rows extending parallel to the side chains on either side of the series of traction rings, each connector element comprising a unitary structure having a symmetrical triradial configuration providing three radially extending pairs of parallel lugs, the lugs of each pair providing respective ground-engaging edges and defining a clevis for receiving an end link of a respective connector chain, and including a removable clevis pin for retaining said end link.

* * * * *